US012307417B2

(12) United States Patent
Bus et al.

(10) Patent No.: US 12,307,417 B2
(45) Date of Patent: May 20, 2025

(54) DATA PROTECTION PROCESS TOOL

(71) Applicant: Oracle International Corporation, Redwood Shores, CA (US)

(72) Inventors: Jennifer Bus, Mountlake Terrace, WA (US); Jaime Ismael Rangel Martinez, Seattle, WA (US); Vijayan Radhakrishnan, Santa Clara, CA (US); Pamela Marie Simpson, Belgrade, MT (US)

(73) Assignee: Oracle International Corporation, Redwood Shores, CA (US)

( * ) Notice: Subject to any disclaimer, the term of this patent is extended or adjusted under 35 U.S.C. 154(b) by 132 days.

(21) Appl. No.: 17/880,274

(22) Filed: Aug. 3, 2022

(65) Prior Publication Data

US 2024/0046200 A1 Feb. 8, 2024

(51) Int. Cl.
*G06Q 10/087* (2023.01)

(52) U.S. Cl.
CPC ................... *G06Q 10/087* (2013.01)

(58) Field of Classification Search
CPC .................................................... G06Q 10/087
See application file for complete search history.

(56) References Cited

U.S. PATENT DOCUMENTS

| 9,633,494 | B1* | 4/2017 | Sun .................... G06K 7/10366 |
| 11,810,056 | B1* | 11/2023 | Eccles ................. G06Q 10/047 |
| 11,832,416 | B1* | 11/2023 | Albright ............. H05K 7/1492 |
| 2007/0095906 | A1* | 5/2007 | Camilleri ............ G06Q 10/087 |
| | | | 235/385 |
| 2007/0198505 | A1* | 8/2007 | Fuller ................. G06F 16/9537 |
| | | | 707/999.005 |
| 2007/0239568 | A1* | 10/2007 | Conley ................ G06Q 20/403 |
| | | | 705/28 |
| 2009/0189767 | A1* | 7/2009 | Primm ................. H01Q 1/2216 |
| | | | 340/572.1 |
| 2013/0046884 | A1* | 2/2013 | Frost ........................ G06F 9/06 |
| | | | 709/224 |
| 2015/0009013 | A1* | 1/2015 | Cartwright ........ G06K 7/10297 |
| | | | 340/10.1 |

(Continued)

OTHER PUBLICATIONS

Brignone, Cyril, et al. "Real time asset tracking in the data center." Distributed and Parallel Databases 21 (2007): 145-165. (Year: 2007).*

*Primary Examiner* — Nathan A Mitchell
(74) *Attorney, Agent, or Firm* — Kilpatrick Townsend & Stockton LLP

(57) ABSTRACT

Techniques disclosed herein may include receiving a request to transfer an asset. The techniques may include accessing an asset record comprising an asset type, an asset location, and a location history for the asset. The techniques may include determining whether the asset is a volatile asset using the asset type. The techniques may include determining whether the location history is a complete location history for the asset. The techniques may include determining whether the asset is an unused asset using the location history. The techniques may include determining whether the asset is listed in an inventory list using the asset location. The techniques may include approving the request based at least in part on a determination that the asset is the volatile asset, the location history is the complete location history, the asset is unused, and the asset is in the inventory list.

11 Claims, 10 Drawing Sheets

(56) References Cited

U.S. PATENT DOCUMENTS

| | | | |
|---|---|---|---|
| 2015/0012566 A1* | 1/2015 | Cartwright | G06K 7/10297 |
| | | | 707/805 |
| 2015/0206094 A1* | 7/2015 | Hayes | G06K 7/10356 |
| | | | 705/28 |
| 2018/0285607 A1* | 10/2018 | Chojnacki | G06K 7/10366 |
| 2023/0126538 A1* | 4/2023 | Savage | G06Q 10/087 |
| | | | 713/175 |
| 2024/0013146 A1* | 1/2024 | Thomas | G06Q 10/087 |
| 2024/0029015 A1* | 1/2024 | Seal | G06Q 10/087 |

* cited by examiner

DATA PROTECTION PROCESS TOOL

ARTICLE I. BACKGROUND

Reusing a datacenter's data bearing assets can cause the unintended exposure of data. Any uncertainty about an asset's history can lead to a determination that the asset should be destroyed. Additionally, data bearing assets, that can safely be reused, may accidentally be destroyed because there is no centralized way to determine if the asset was previously used, or what state it is currently in. These inefficiencies can result in millions of dollars of datacenter assets being unnecessarily destroyed annually. Accordingly, improvements in datacenter asset management are desirable.

ARTICLE II. BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer—implemented method may include receiving a request to transfer an asset. The method may include accessing an asset record that includes an asset type, an asset location, and a location history for the asset. The method may also include determining whether the asset is a volatile asset using the asset type. The method may further include determining whether the location history is a complete location history for the asset. The method may in addition include determining whether the asset is an unused asset using the location history. The method may also include determining whether the asset is listed in an inventory list using the asset location. The method may further include approving the request based at least in part on a determination that the asset is the volatile asset, the location history is the complete location history, the asset is unused, and the asset is in the inventory list. The techniques disclosed herein can include other embodiments of this aspect include corresponding computer systems, apparatus, and computer programs recorded on one or more computer storage devices, each configured to perform the actions of the methods.

The techniques disclosed herein may include one or more of the following features. Techniques where the request may include a unique identifier associated with the asset. Techniques where the volatile asset is a volatile memory. Techniques where the volatile asset is capable of storing data while the volatile asset is powered. Techniques where is it determined that the location history is the complete location history in accordance with the asset location and a last entry in the location history matching. Techniques where the asset listed in the inventory list is a spare. Techniques where the location history may include a chronological record of the location of the asset. Implementations of the described techniques may include hardware, a method or process, or a computer tangible medium.

ARTICLE III. BRIEF DESCRIPTION OF THE DRAWINGS

ARTICLE IV. DETAILED DESCRIPTION

Figure 1:
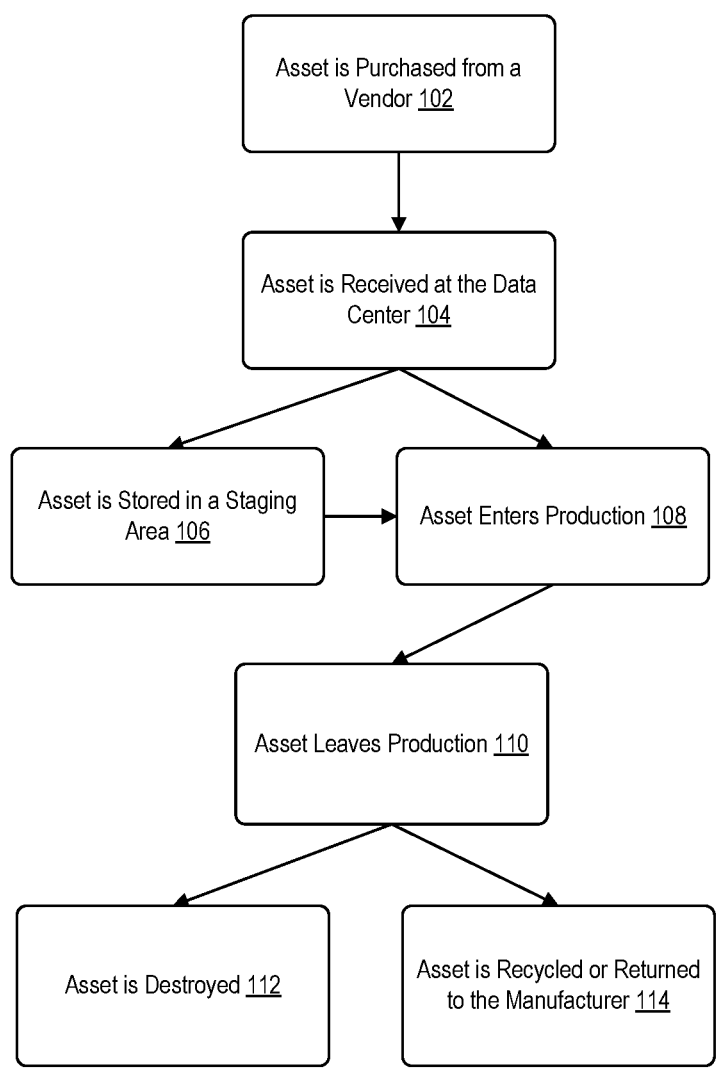
FIG. 1 shows a simplified diagram of an asset lifecycle according to an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques for tracking assets in a datacenter are disclosed herein. Assets in a datacenter, such as cables, hard drives, processors, network cards, and other computer components, can threaten the security of information hosted on the center's servers. For instance, a data bearing asset, that retains data after being removed from production, can expose any retained data if the asset is reused. Datacenter security and compliance can require that all postproduction hardware either remain in the datacenter, be destroyed, or be sanitized in accordance with standards (e.g., such as National Institute of Standards and Technology Special Publication 800-88 Rev. 1).

An asset can be a data risk if the asset is a data bearing asset that has entered production by being used in the datacenter. A data risk means that the asset may contain data that could be leaked if the asset is not remanufactured or destroyed. For instance, a network cable can enter production if it is connected to a computer in the datacenter. A non-volatile asset is a computer component that can retain data after being removed from power (e.g., a data bearing asset), and a volatile, or non-data bearing asset, can be an asset that does not retain data without power. For instance, the network cable is a volatile asset while certain memory cards, for example, those that can retain data without power, may be a non-volatile asset. A volatile asset can be reused because the asset does not store data that can be leaked if the asset is reused or transferred to a different datacenter.

Establishing that an asset has not entered production, and can be reused or transferred, can be a tedious manual process. Without a datacenter tracking system (DTS) for tracking an asset throughout the asset's lifecycle, the evidence that an asset is unused can be limited to physical inspection of tamper bags or human attestation that the asset has not entered production (e.g. that the asset is unused).

Inspection or tamper bags are indirect evidence of the asset's chain of custody and the evidence is not readily accessible for audit or investigation purposes. Asset tracking and a chain of custody for the asset can be monitored systematically by a DCTS. Additionally, asking employees to determine whether an asset is data bearing, rather than having the employees consult DTS records, can be a potential source of error and data can be leaked because an employee is mistaken about the volatility of a product she is handling. Instead, a datacenter employee can use the DTS to quickly and dependably determine the potential risk of relocating an asset.

Asset records in the DTS can be used to determine whether the asset is a potential data risk. A datacenter employee can use a unique identifier (e.g., serial number) associated with the asset to retrieve the asset's record. The asset record can identify an asset type, an asset location, and a location history for the asset. Because assets can be reliably tracked, non-data bearing assets can be reused within a datacenter, transferred between datacenters, or transferred between regions in a datacenter. Asset records on the DTS can be accessed, and modified, using electronic devices such as a tablet computer, a personal computer, a smartphone, a smartwatch, a mobile device, or any other suitable computing device.

An entry in the location history can be created each time a datacenter employee interacts with the asset. For instance, an entry can be created when the asset is received, stored, transferred, deployed, remanufactured, or destroyed. The location history can act as a chain of custody that provides evidence that the asset has entered production or remains unused. This chain of custody can be used to audit an employee's actions if a security incident occurs. The asset location can be an entry in the asset record of the asset's current location. The datacenter employee can manually enter the asset location to the DTS and the current location can be compared to the entry in the location history. If the asset location and the last entry in the location history differ, the DTS can flag the asset as a potential data risk because the asset's location has changed without a recorded explanation for the transfer. The asset type can be an entry in the asset record that records whether the asset is data bearing or non-data bearing. If the asset is non-data bearing it can be reused or transferred to a new location even if the asset has been used.

In an illustrative example, a first datacenter employee receives a work order to repair a first server. The employee removes a network interface card (NIC) from a first server and replaces the NIC with a spare asset. After removal, the first employee scans the NIC's unique identifier, and the DTS notifies the employee that the NIC should be returned to the manufacturer with a return merchandise authorization (RMA). After repair, the first employee inadvertently places the NIC in a spares pile rather than shipping the NIC to the manufacturer. Later, a second employee receives a work order instructing him to replace a broken NIC on a different server. The second employee retrieves the NIC from the spares pile and begins to repair the second server. Before replacing the NIC, the employee scans the unique identifier and receives a notification from the DTS that the NIC is a data bearing product that had entered production. The second employee retrieves a different component and repairs the server without exposing the server to a data risk.

FIG. 1 shows a simplified diagram 100 of an asset lifecycle according to an embodiment. The asset lifecycle shows the path of an asset from the asset's purchase to the asset's destruction, recycle or remanufacture. The asset can be an electronic device or computer component that is used in a datacenter such as network cables, power cables, hard drives, processors, network cards and other computer components. For instance At block 102, the asset can be purchased from a vendor.

At block 104, the asset can be received at the datacenter. At block 106, the asset can be stored in a staging area within the datacenter. The staging area can store spare assets that can be used to maintain servers in the staging area. The datacenter can be divided into different regions and each region can have a staging area with spare components. Assets may need approval before they can be removed from the staging area, transferred between staging areas, or moved between regions.

At block 108, the asset can enter production. The asset can enter production by being powered, connected to an electronic device, installed as a part of an electronic device, or removed from a tamper proof packaging. The asset can enter production after the asset is received at block 104 and without entering a staging area at block 106. The asset can enter production after being retrieved from the staging area at 106

At block 110, the asset can leave production. The asset may leave production because it is broken, obsolete, or as part of regular maintenance. An asset may leave production because it needs to be remanufactured or otherwise repaired. At block 112, the asset that has left production can be destroyed. The asset may be destroyed because it is a data-bearing (e.g., non-volatile) asset. A non-data bearing asset may be destroyed if it was part of a secure region in the datacenter such as a government secure region (e.g., a National Security Region). The asset can be destroyed on site with methods calibrated to ensure that no data can be recovered from the asset. For instance, the asset may be burned, melted, or ground so that data retained on the asset is not recoverable.

At block, 114, the asset can be recycled or returned to the manufacturer. Recycling the asset can mean returning the asset to production or a staging area without substantial modification. For instance, a network cable may be able to be plugged into a different electronic device. An asset may be repaired before it is recycled. Repairing the asset can mean physically modifying the asset, changing the software, changing the firmware, etc. The asset may be recycled within a region in the datacenter (e.g., used on a different electronic device in the datacenter region), transferred to a different region within the datacenter, or transferred to a different datacenter. The asset may be returned to the manufacturer. The manufacturer may refurbish the asset and resell the refurbished asset or return the refurbished asset to the datacenter. If the asset left production because the asset failed, the manufacturer may study the asset to determine what caused the failure.

Figure 2:
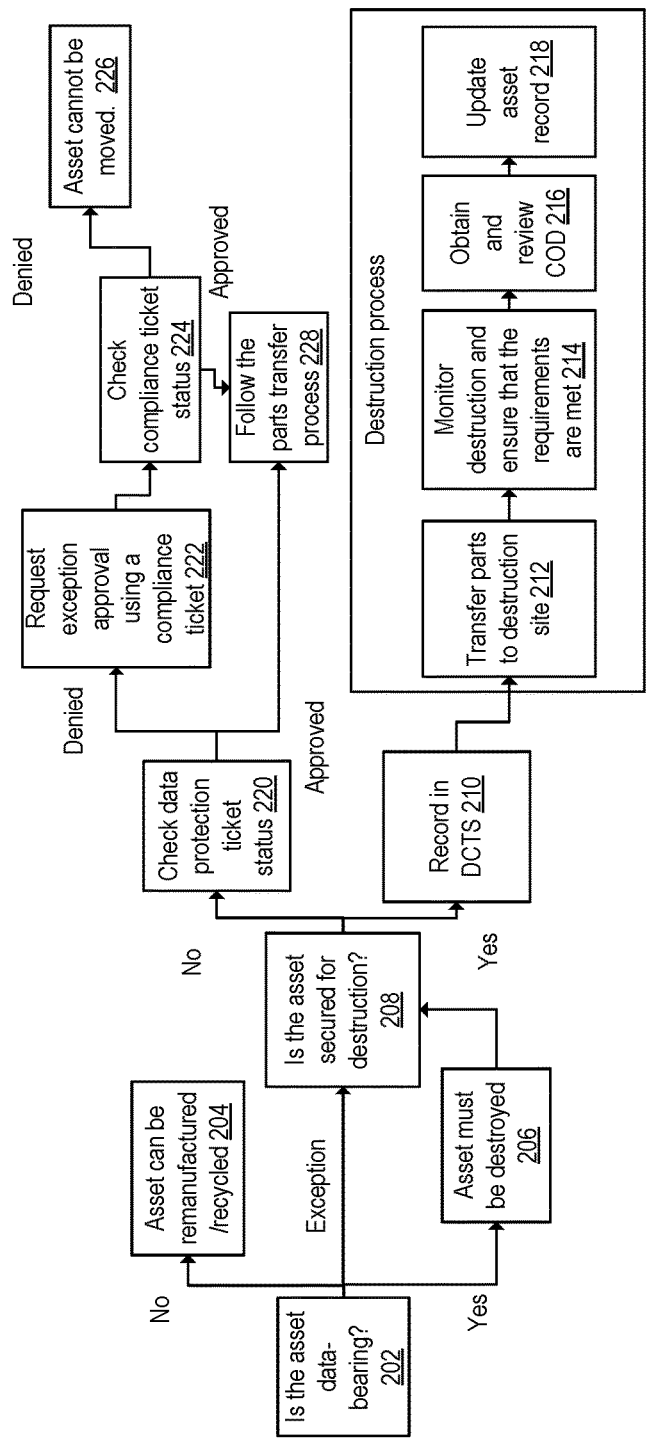
FIG. 2 shows a data protection workflow 200 according to an embodiment.

FIG. 2 shows a data protection workflow 200 according to an embodiment. The data protection workflow 200 can be used to determine how to handle a part (e.g., an asset) that has been removed from service. Assets can include network cables, processors, graphics processing units (GPUs), network interface cards (NICs), network cables, power cables, cooling components, input devices, output devices, computer storage device, and the like. An asset can be in service if it is removed from tamper proof packaging, installed in an electronic device, connected to an electronic device, or powered. An asset can be removed from service if it is disconnected from an electronic device (after having been connected), uninstalled, or removed from power.

At block 202, whether an asset is data bearing can be determined. An employee can determine that the part is data bearing by providing a unique identifier associated with the asset to a data protection system. The unique identifier can be provided manually, using a camera with optical character recognition, using a bar code scanner, a radio frequency identifier (RFID) scanner, etc. The data protection system can use the unique identifier to retrieve an asset record for the asset from an asset tracking database. The asset record can comprise a "data-bearing" field and value in the field can be: "yes," "no," or "exception."

At block 204, the asset can be remanufactured or recycled if the DTS asset record shows that the asset is a non-data bearing asset that has not been in a secure region. For instance, if the value for a data bearing field in the asset record is "no" indicating that the asset is volatile and not data bearing. Remanufacturing can mean that the asset is rebuilt to the specifications of the original manufactured product. This can mean replacing components, updating software, updating firmware, etc. The asset may have to be packaged and shipped to the manufacturer for remanufacturing. A recycled asset can be reused and returned to production. The asset may be returned to production in the same datacenter region where it was removed from production, shipped to a different region within the datacenter, or shipped to a different datacenter. The asset may be returned to a spares inventory or directly put back into production.

At block 206, the asset can be marked for destruction if the asset record shows that the asset should be destroyed. For instance, if the value in the data bearing field is "yes" indicating that the asset is non-volatile and data-bearing asset that has been in production. An asset that is not data bearing but was in a secure region may be marked for destruction. At block 208, whether the asset is secured for destruction can be determined. An asset can be secured for destruction if it is in a locked bin, room, or designated area for assets that will be destroyed. At block 210, the asset record in the DTS can be updated to reflect that the asset has been secured for destruction. For instance, a "secured for destruction" field in the asset record can be updated from "no" to "yes" in the asset record stored in DCTS.

At block 212, the part that is marked for destruction in 210 can be transferred to a destruction site. The destruction site can be located in the datacenter, at premises controlled by the vendor, or at a dedicated destruction facility. At block 214, the destruction process can be monitored to ensure that the requirements are met. The requirements can require that the device's memory is wiped before physical destruction. During the destruction process, the device may be destroyed using more than one physical destruction techniques. For instance, the device may be shredded and then burned.

At block 216, the certificate of data destruction (COD) can be obtained and reviewed. The COD is a certificate that documents information about the destruction process. For instance, the COD can include a unique identifier for the destruction event, a unique identifier for the destroyed device, the site where the device was destroyed, the employee(s) who participated in the destruction event, the techniques used to destroy the device, a start time for the destruction event and an end time for the destruction event. The COD provides evidence that the destruction was performed properly and that any data stored on the device is destroyed. At block 218, the asset record can be updated to reflect that the asset has been destroyed. For instance, a "state tracking" field in the asset record can be updated from "secured" to "destroyed."

At block 220, if the asset was not secured for destruction at 208, the data protection ticket status can be checked. The data protection ticket can record whether the asset has been in a secure region. If the asset has been in a secure region the asset may need to be destroyed even if the asset is not data bearing. The data protection ticket status can be "approved" if the asset was not in a secure region and "denied" if the asset was in a secure region. The data protection ticket status can be "approved" if the asset was cleared of all protected data and "denied" if the asset still retains protected data. At block 222, if the data protection ticket status from 220 is "denied," exception approval can be requested using a compliance ticket.

At block 224, the status of the compliance ticket can be checked. The status of the compliance ticket can be "denied' or "approved." At block 226, if the status of the compliance ticket is "denied," the asset may not be able to leave the datacenter or region. The asset may be stored in a staging area, bin, or room in the datacenter. The asset record in the DTS may be updated to reflect that the asset cannot be moved. At block 228, the parts transfer process can be followed if the compliance ticket status in 224 is "approved" or if the data protection ticket status at 220 is "approved." The parts transfer process can include indicating that the part is being transferred and identifying a destination for the part in the asset record.

Figure 3:
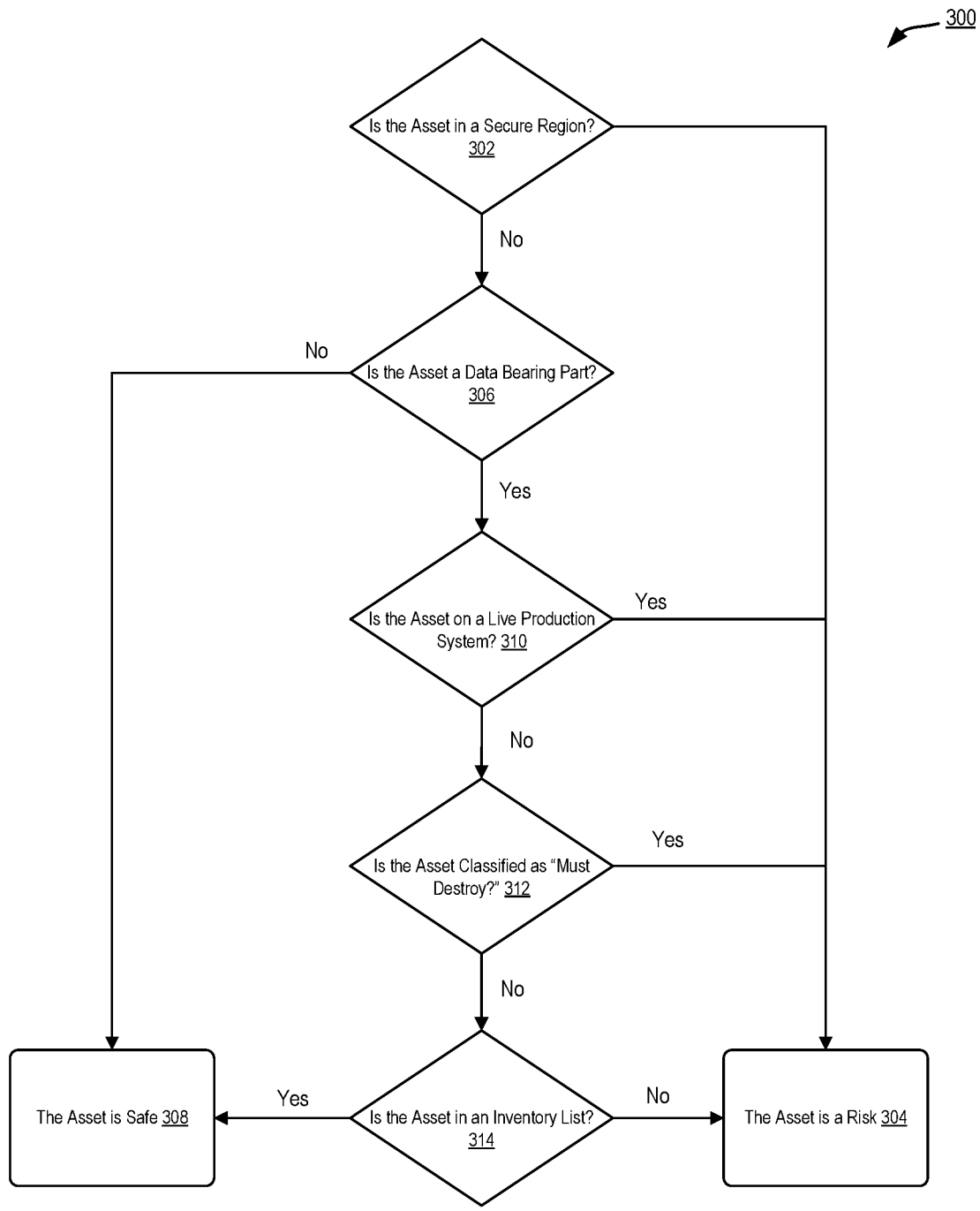
FIG. 3 shows a process for determining if an asset is a risk according to an embodiment.

FIG. 3 shows a process 300 for determining if an asset is a risk according to an embodiment. The process can be used as part of the data protection workflow 200 disclosed in reference to FIG. 2, and, for instance, process 300 can be used at block 202. Process 300 can be presented as a series of questions to an employee accessing an asset record in the DTS (e.g., via a user interface (UI)). The employee can be prompted to provide a unique identifier associated with the employee (e.g., badge number, username, alphanumeric code, etc.) before answering the questions. The DTS can be used to audit an employee's behavior because the answers to process 300 can be associated with the employee by the unique identifier.

At block 302, whether the asset is in a secure region can be determined. If the asset is in a secure region, the asset is a risk 304. A secure region can contain sensitive information such as medical information, government secrets, legal information, trade secrets, etc. Because of the sensitivity of the information stored in a secure region, the assets in that region are presumed to be data bearing because the cost of a data breach is extremely high. An employee accessing the DTS may be prompted to answer "yes" "no" or "exception" to the question "is the asset in a secure region."

The user may be asked to identify the region where the asset is located and the DTS may cross reference the location against a list of secure regions stored in a database to determine if the asset is in a secure region. The employee's unique identifier can be used to verify whether the employee's answer is accurate (e.g., check the employee's permissions against the identified location). The DTS can check a "location" field in the asset record to determine if the asset is in a secure region by cross referencing the location against a list of secure regions. The asset record may contain a "secure region" field that can indicate if the asset is in a secure region.

At block 306, whether the asset is a data bearing part can be determined. An employee can determine that the part is data bearing by providing a unique identifier associated with the asset to a data protection system. The unique identifier can be provided manually, using a camera with optical character recognition, using a bar code scanner, a radio frequency identifier (RFID) scanner, etc. The data protection system can use the unique identifier to retrieve an asset record for the asset from an asset tracking database. The asset record can include a "data-bearing" field and value in the field can be: "yes," "no," or "exception." The employee may be asked to provide an answer of "yes," "no," or "exception." to the question "is the asset a data bearing part" via the DTS UI.

If the part is not a data bearing part, and the part is not in a secure region, the asset can be a safe asset 308. Safe assets may be assets that can be returned to production (e.g., reused) because it is unlikely, or impossible, that the safe asset 308 contains data that could be exposed if the asset is reused. A safe asset 308 can also be transferred between regions or datacenters, however, the safe asset may need to be refurbished or remanufactured before transfer or reuse (e.g., the asset's firmware may have to be updated). In some circumstances, the safe asset may be returned to the asset's manufacturer for diagnostics (e.g., to determine why the asset failed).

At block 310, whether the asset is on a live production system can be determined. An employee can determine if the asset is on a live production system by physical inspection (e.g., observing that the asset is in production and physically attached to a computing device). The employee may be asked to manually provide an answer of "yes", "no", or "exception" to the question "is the asset on a live production system" via the DTS UI. The DTS can determine if the asset is on a live production system using the asset record. For instance, the asset record may contain a "in production field", and the "in production field" may be updated from "no" to "yes" in response to a work order associated with the asset's unique identifier. If the asset is on a live production system the asset is a risk 304.

At block 312, whether the asset was classified as "must destroy" can be determined. The asset record can have a field for "must destroy" and the. An asset that is classified as "must destroy" is a risk and should be destroyed. An asset can be labeled "must destroy" because the asset cannot be cleared of protected data to an acceptable level that would allow the asset to be released or reused with minimal risk.

At block 314, whether the asset is in an inventory list can be determined. An inventory list can be list of assets that are available as spares and can be used as replacement parts in the datacenter. If the asset is not in an inventory list, or is in an inventory list for a different region or datacenter, then the asset's chain of custody could be uncertain. The asset record may have a "inventory" field that indicates the inventory list for the asset. If the asset is not in an inventory list, or if the asset is in the wrong inventory list, then it is uncertain whether the asset was used. An asset in an inventory list can be a safe asset 308 while an asset that is not in an inventory list can be a risk 304.

Figure 4:
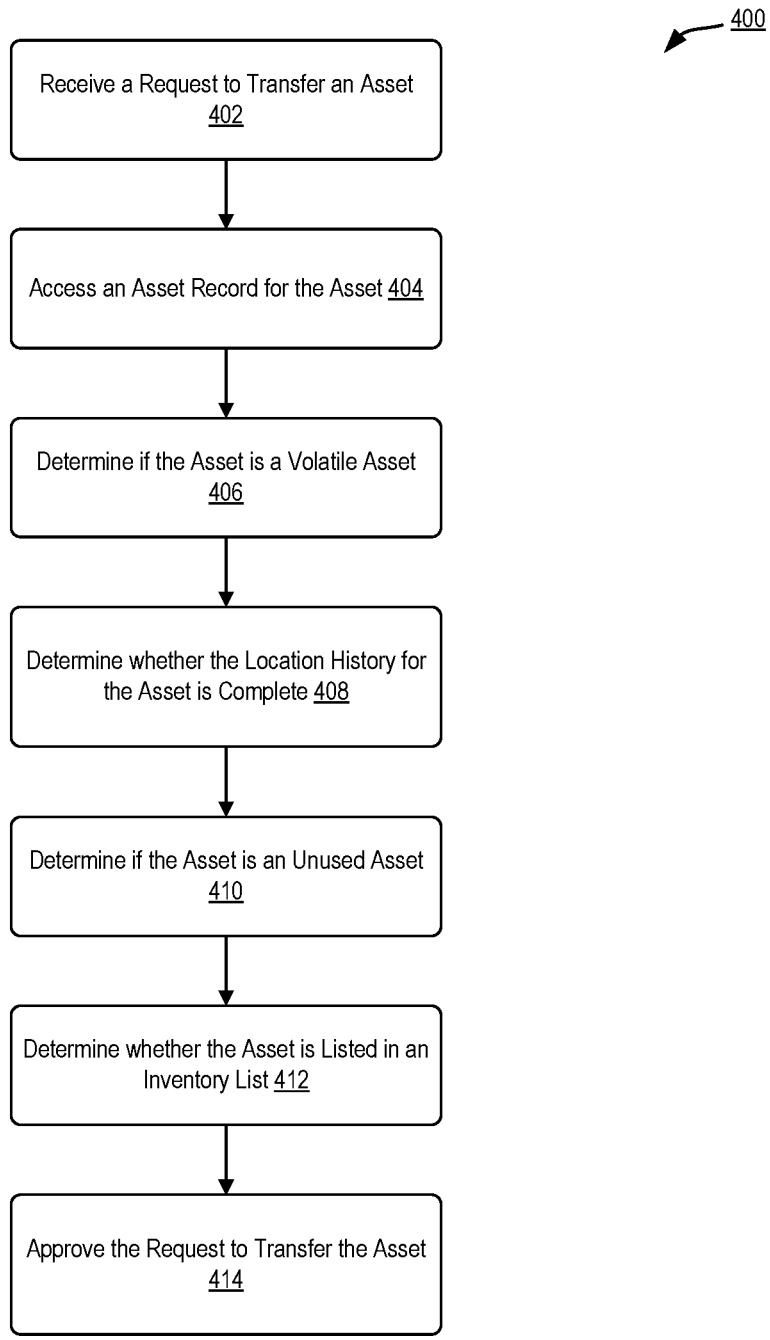
FIG. 4 shows a method for datacenter asset tracking according to an embodiment.

FIG. 4 shows a method 400 for datacenter asset tracking according to an embodiment. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

Turning to method 400 in greater detail, at block 402, a request to transfer an asset can be received. The request can be received at the DTS 502 via a user interface (UI) 506. An employee can provide the request to the DTS via a network connection such as a wide area network (WAN), a local area network (LAN), a wireless network connection, etc. The request can comprise a unique identifier associated with the asset. The user may provide the request by scanning the unique identifier associated with the asset (e.g., scanning a barcode on a tamper proof box containing the asset). The asset request may be provided with a unique identifier associated with the employee providing the request. For instance, the request may be provided via an electronic device that an employee has accessed using the unique identifier.

At block 404, an asset record can be accessed. The asset can be accessed from a database of a computing device. The asset record can comprise an asset record, a location, and a location history for the asset. The asset location may be provided to the DTS using the user interface (UI) 506. The asset location may be provided by an employee, or the asset location may be automatically generated in response to the transfer request. The asset request may be generated by an employee who is approved in a given region and the asset location can be automatically updated when the employee makes the request. The asset record can be accessed via access tracking database API 510 in response to an instruction from the DTS processor 504.

At block 406, whether the asset is a volatile asset can be determined using the asset type. A volatile asset can be volatile memory or an asset that can retain data while the asset is powered. A volatile asset may be incapable of storing memory when the asset is removed from power, and the volatile asset can be a volatile memory.

At block 408, whether the location history is a complete location history for the asset can be determined using the asset record. A location history can be a complete location history if the location is a record of every location for the asset from the time the asset is received from a manufacturer until the present time. The location history can include at least one of a record of the receipt of the asset from a manufacturer, one or more records for the storage of the asset, one or more records for the transfer of the asset, one or more records for the deployment of the asset, or a record for the destruction of the asset. Whether the location history is a complete location history can be determined using the location history and the asset location. If the location history, or asset record, lists a different location than the asset location then the asset history may not be a complete location history.

At block 410, whether asset is an unused asset can be determined using the location history. An asset may be an unused asset if the location history, asset record, or asset location does not include a record of a deployment of the asset to production.

At block 412, whether the asset is listed in an inventory list can be determined using the asset location. Whether the asset is listed on an inventory list can be determined using a record retrieved from an asset tracking database via the asset tracking database API 510.

At block 414, the request can be approved. The request can be approved based at least in part on a determination is a volatile asset, the location history is the complete location history, the asset is unused, and the asset is in the inventory list. The asset may be transferred even if the asset is used and was in production if the asset is a volatile asset. A non-volatile asset may be transferred if the asset is unused and was located in an inventory list.

Figure 5:
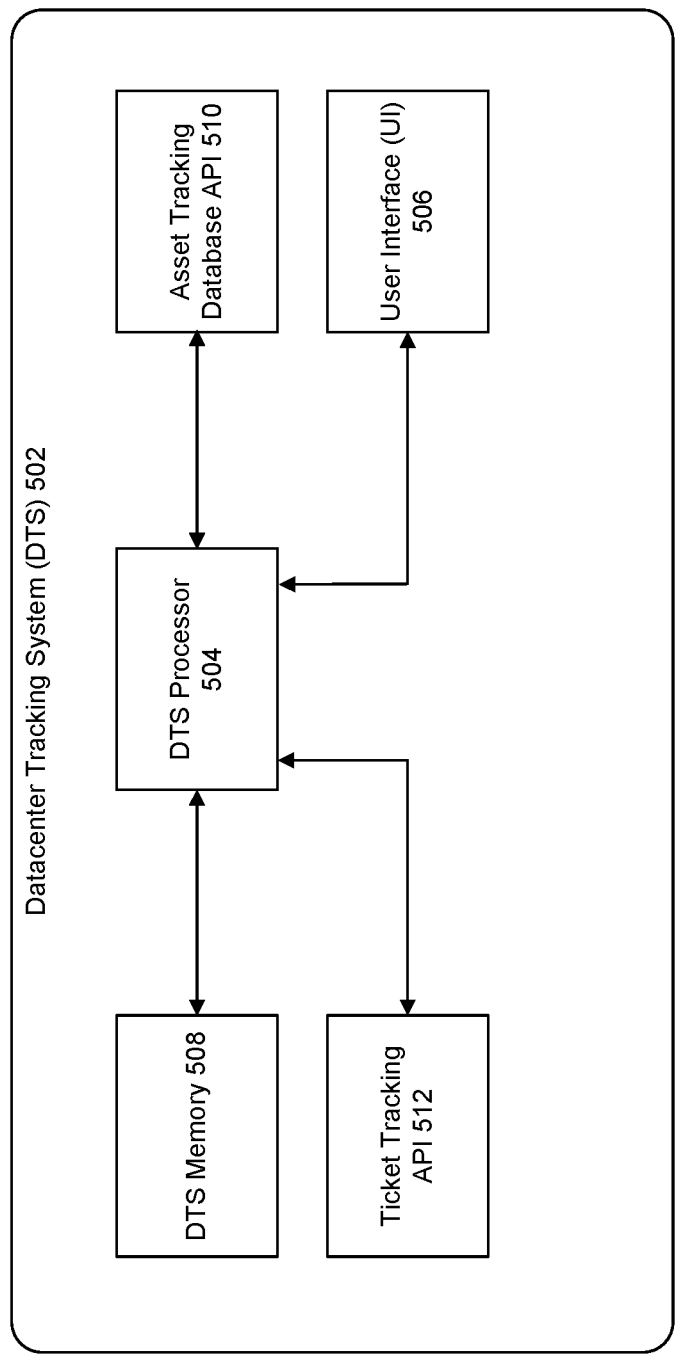
FIG. 5 is a simplified high level system diagram for an Datacenter Tracking System according to an embodiment.

FIG. 5 is a simplified high level system diagram 500 for an Datacenter Tracking System (DTS) according to an embodiment. The DTS 502 can contain a DTS processor 504 that can execute software to implement the DTS 502. The DTS processor 504 can be one or more chips with one or more cores located on one or more computing devices. DTS 502 can receive a request to transfer an asset from the asset's current location to a different location (e.g., transfer request) via the user interface (UI) 506. The received transfer request can be stored in the DTS memory 508 by the DTS processor 504. DTS memory 508 can be cache memory, a database, or volume for DTS 502.

DTS 502, through DTS processor 504, can communicate with asset tracking database(s) via an asset tracking database API 510. Asset records can be retrieved from the asset tracking database(s) via asset tracking database API 510 and stored in DTS memory 508. An asset record can be retrieved using a unique identifier associated with the asset. One or more databases may be accessed by the asset tracking database API 510.

DTS 502 can communicate with a ticket tracking system via ticket tracking API 512. DTS 502 can communicate with ticket tracking API 512 using DTS processor 504. Protection tickets or compliance tickets can be retrieved from the ticket tracking system using ticket tracking API 512. Requests for the ticket tracking service to generate a new data protection tickets or compliance ticket can also be sent from DTS 502 via ticket tracking API 512. A request to generate a compliance ticket can be sent in response to receiving a request to transfer an asset. The request can include the unique identifier associated with the asset.

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like. In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
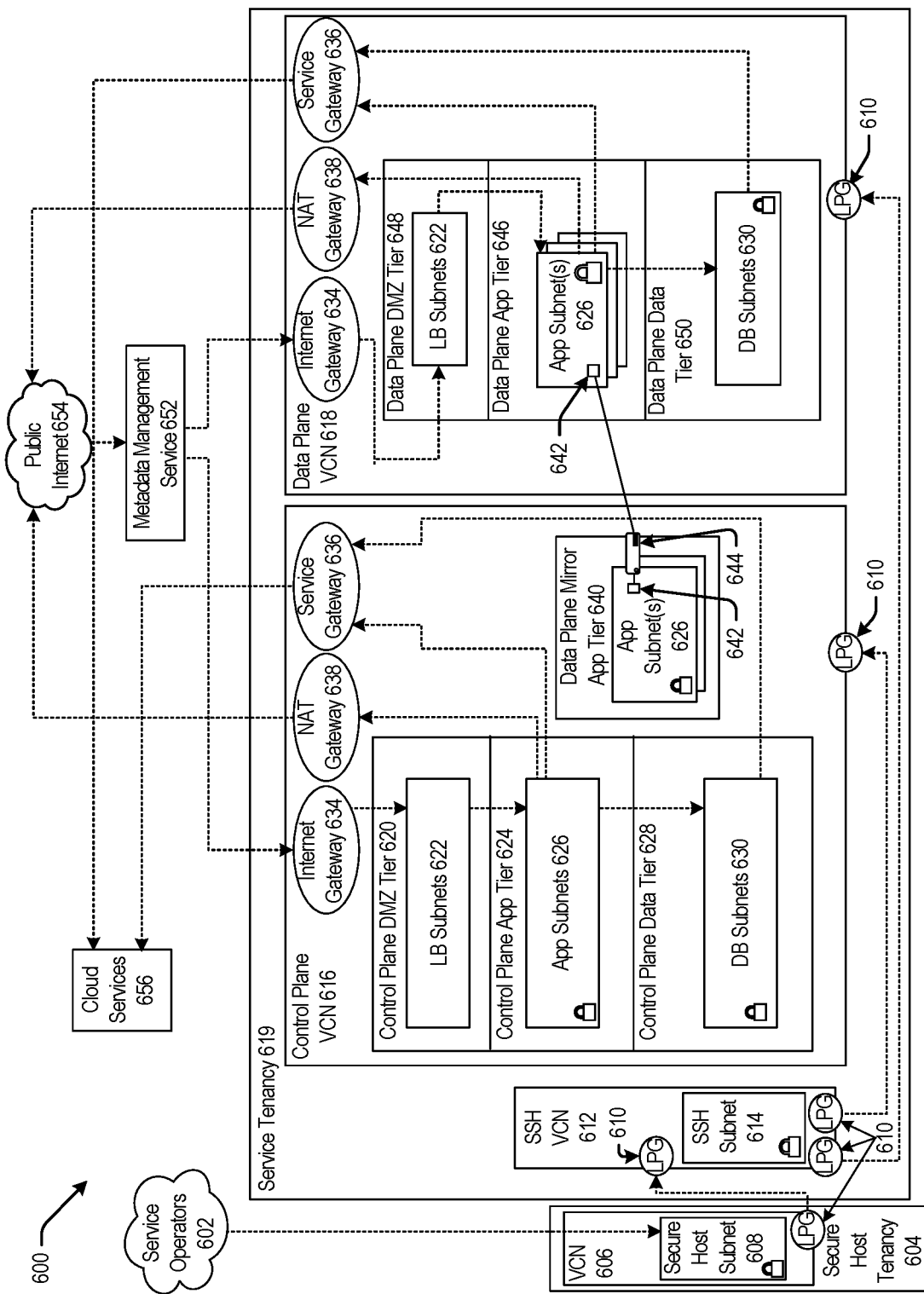
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry®, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep security breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of security, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
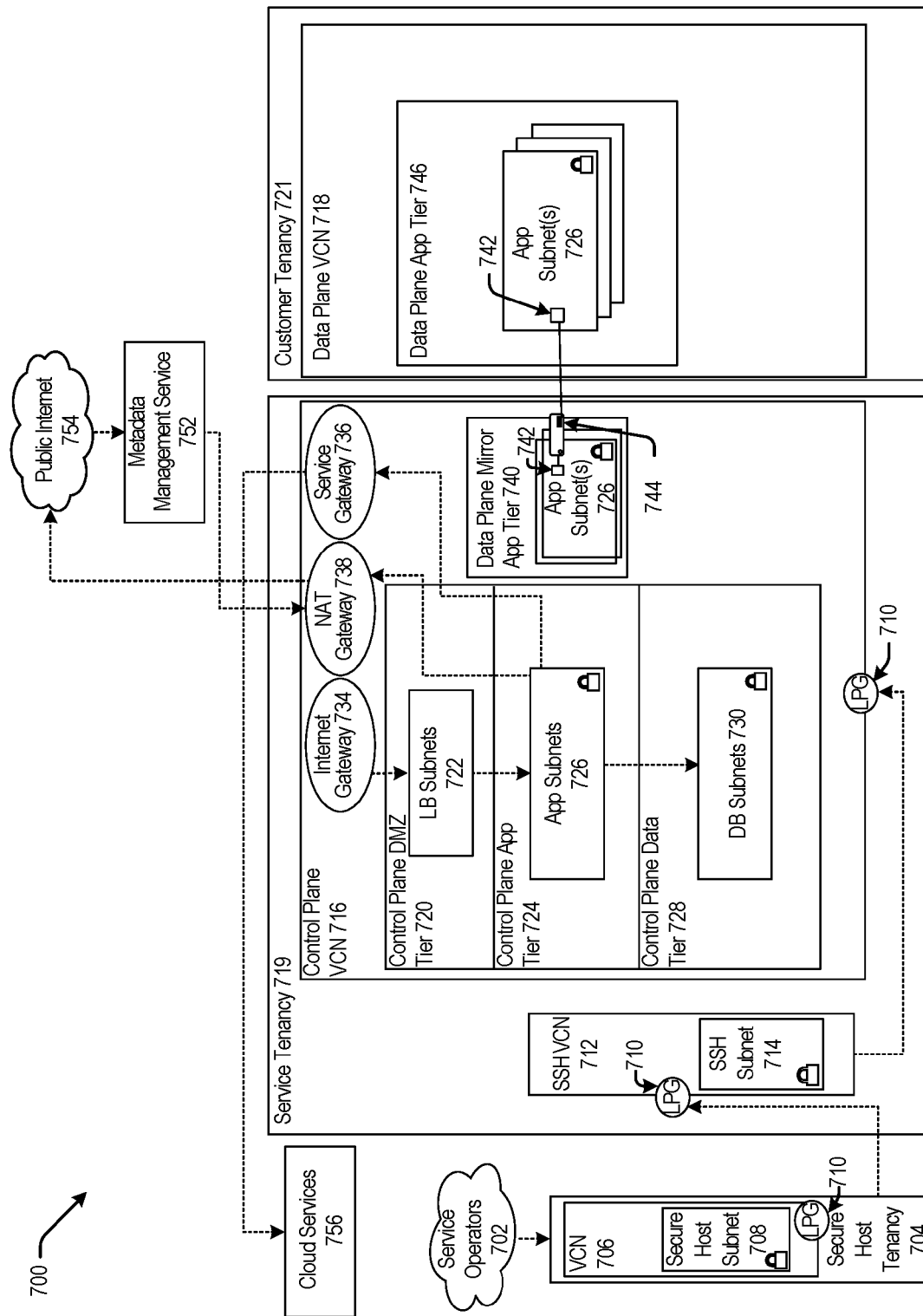
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
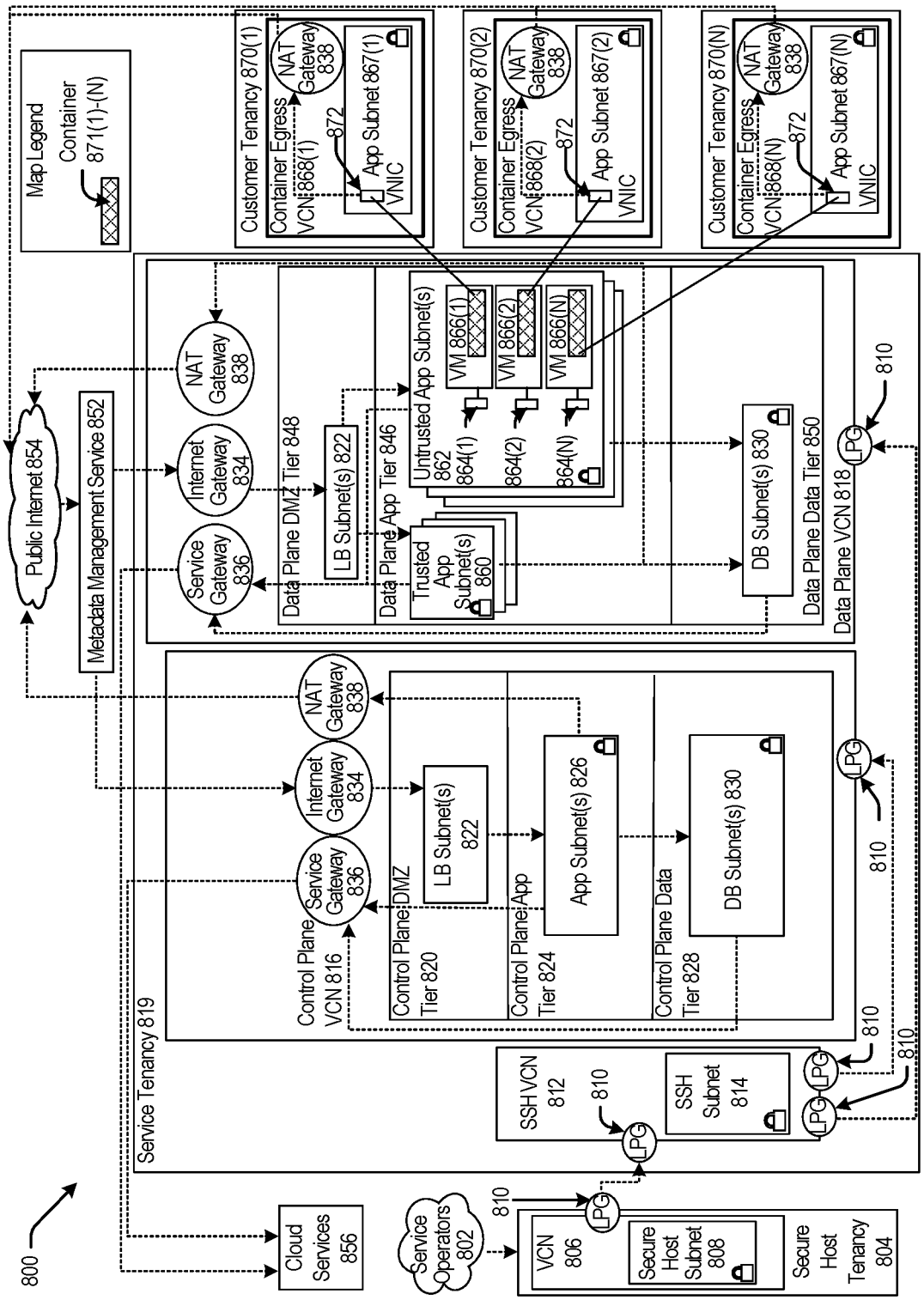
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
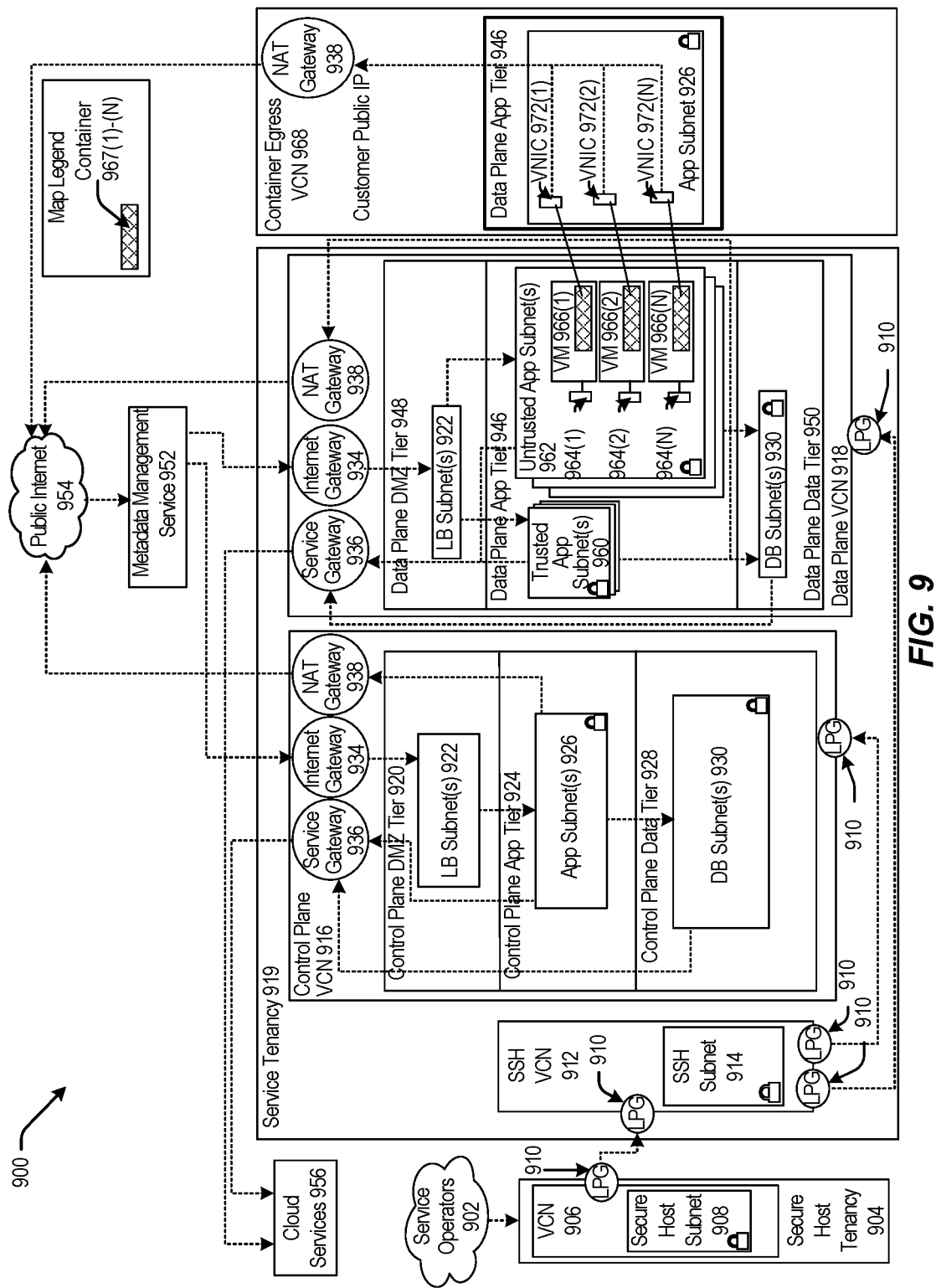
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
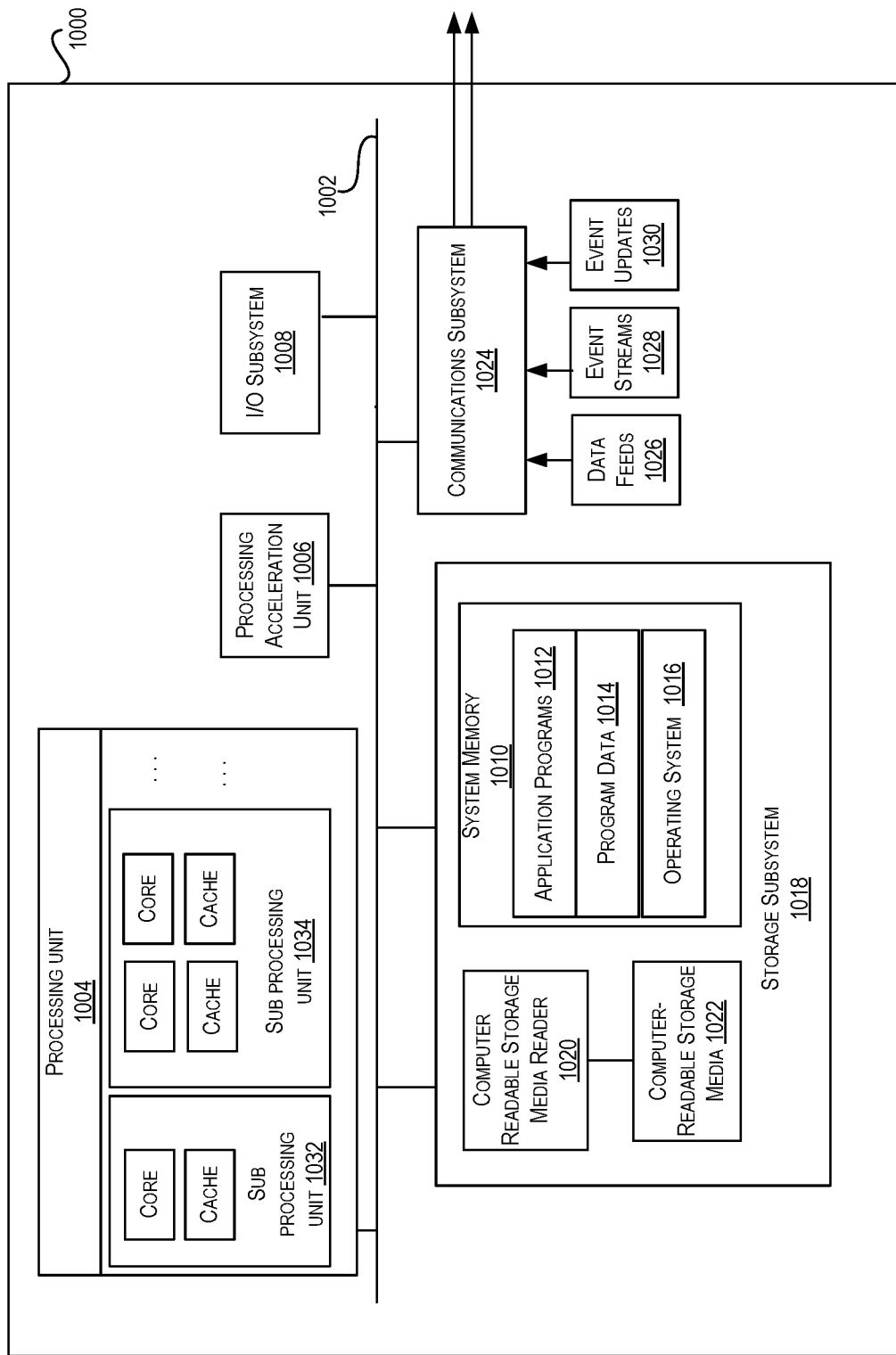
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage sub system 1018 and a communications sub system 1024. Storage sub system 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1018 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
    transmitting, by a computing device and to a user device, computer code for presenting a graphical user interface on a user device;
    receiving, by the computing device, from a user device at a user device location, and via the graphical user interface, a request for an asset record of an asset, the request including a first unique identifier of the asset, a second unique identifier of a user that is authenticated on the user device, and the user device location;
    retrieving, by the computing device and from a database of the computing device, the asset record using the first unique identifier, the asset record comprising an asset type and a location history for the asset that includes an asset location;
    determining, by the computing device and using the asset type, that the asset is a data bearing asset;
    verifying, by the computing device, the user device location using a set of permissions that are associated with the second unique identifier, the set of permissions indicating approved locations for the user;
    comparing, by the computing device, the user device location and the asset location to determine whether the location history is a complete location history for the asset; and
    responsive to determining that the location history is not a complete location history and the asset is the data bearing asset, adding, by the computing device, an update to the asset record to indicate that the asset is a potential data risk, the update including the second unique identifier of the user.

2. The method of claim 1, wherein the data bearing asset is a non-volatile memory.

3. The method of claim 1, wherein the data bearing asset is capable of storing data while the data bearing asset is not powered.

4. The method of claim 1, wherein the location history comprises a chronological record of locations of the asset.

5. A system, comprising:
    memory configured to store instructions; and
    one or more processors configured to execute the instructions to at least:
        transmit, to a user device, computer code for presenting a graphical user interface on a user device;
        receive a request for an asset record of an asset from the user device at a user device location and via the graphical user interface, the request indicating a first unique identifier of the asset, a second unique identifier of a user that is authenticated on the user device, and the user device location;
        retrieve, by a database of a computing device, the asset record using the first unique identifier, the asset record comprising an asset type and a location history for the asset that includes an asset location;
        determine, using the asset type, that the asset is a data bearing asset;
        verify the user device location using a set of permissions that are associated with the second unique identifier, the set of permissions indicating approved locations for the user;
        compare the user device location and the asset location to determine whether the location history is a complete location history for the asset; and
        responsive to determining that the location history is not a complete location history and the asset is the data bearing asset, add an update to the asset record to indicate that the asset is a potential data risk, the update including the second unique identifier of the user.

6. The system of claim 5, wherein the data bearing asset is a non-volatile memory.

7. The system of claim 5, wherein the data bearing asset is capable of storing data while the data bearing asset is not powered.

8. The system of claim 5, wherein the location history comprises a chronological record of locations of the asset.

9. A non-transitory computer-readable medium storing a set of instructions, the set of instructions comprising one or more instructions that, when executed by one or more processors of a device, cause the device to:
    transmit, to a user device, computer code for presenting a graphical user interface on a user device;
    receive a request for an asset record of an asset from the user device at a user device location and via the graphical user interface, the request indicating a first unique identifier of the asset, a second unique identifier of a user that is authenticated on the user device, and the user device location;
    retrieve, by a database of a computing device, an asset record comprising an asset type and a location history for the asset;
    determine, using the asset type, that the asset is a data bearing asset;
    verify the user device location using a set of permissions that are associated with the second unique identifier, the set of permissions indicating approved locations for the user;
    compare the user device location and asset location to determine whether the location history is a complete location history for the asset; and
    responsive to determining that the location history is not a complete location history and the asset is the data bearing asset, add an update to the asset record to indicate that the asset is a potential data risk, the update including the second unique identifier of the user.

10. The non-transitory computer-readable medium of claim 9, wherein the data bearing asset is a non-volatile memory.

11. The non-transitory computer-readable medium of claim 9, wherein the data bearing asset is capable of storing data while the data bearing asset is not powered.

* * * * *